331-98 CROSS REFERENCE SEARCH ROOM

Aug. 23, 1960 D. L. JAFFE 2,950,386

LINEARLY RESPONSIVE VOLTAGE GENERATING MEANS WITH VARIABLE INDUCTION COUPLING

Original Filed June 10, 1954

INVENTOR.
D. LAWRENCE JAFFE
BY Darby & Darby
ATTORNEYS

United States Patent Office 2,950,386
Patented Aug. 23, 1960

2,950,386

LINEARLY RESPONSIVE VOLTAGE GENERATING MEANS WITH VARIABLE INDUCTION COUPLING

David Lawrence Jaffe, Great Neck, N.Y., assignor to Polarad Electronics Corporation, Long Island City, N.Y., a corporation of New York Original application June 10, 1954, Ser. No. 435,875, now Patent No. 2,921,186, dated Jan. 12, 1960. Divided and this application Aug. 3, 1959, Ser. No. 831,119

2 Claims. (Cl. 250—20)

Figures 1, 2, 3:
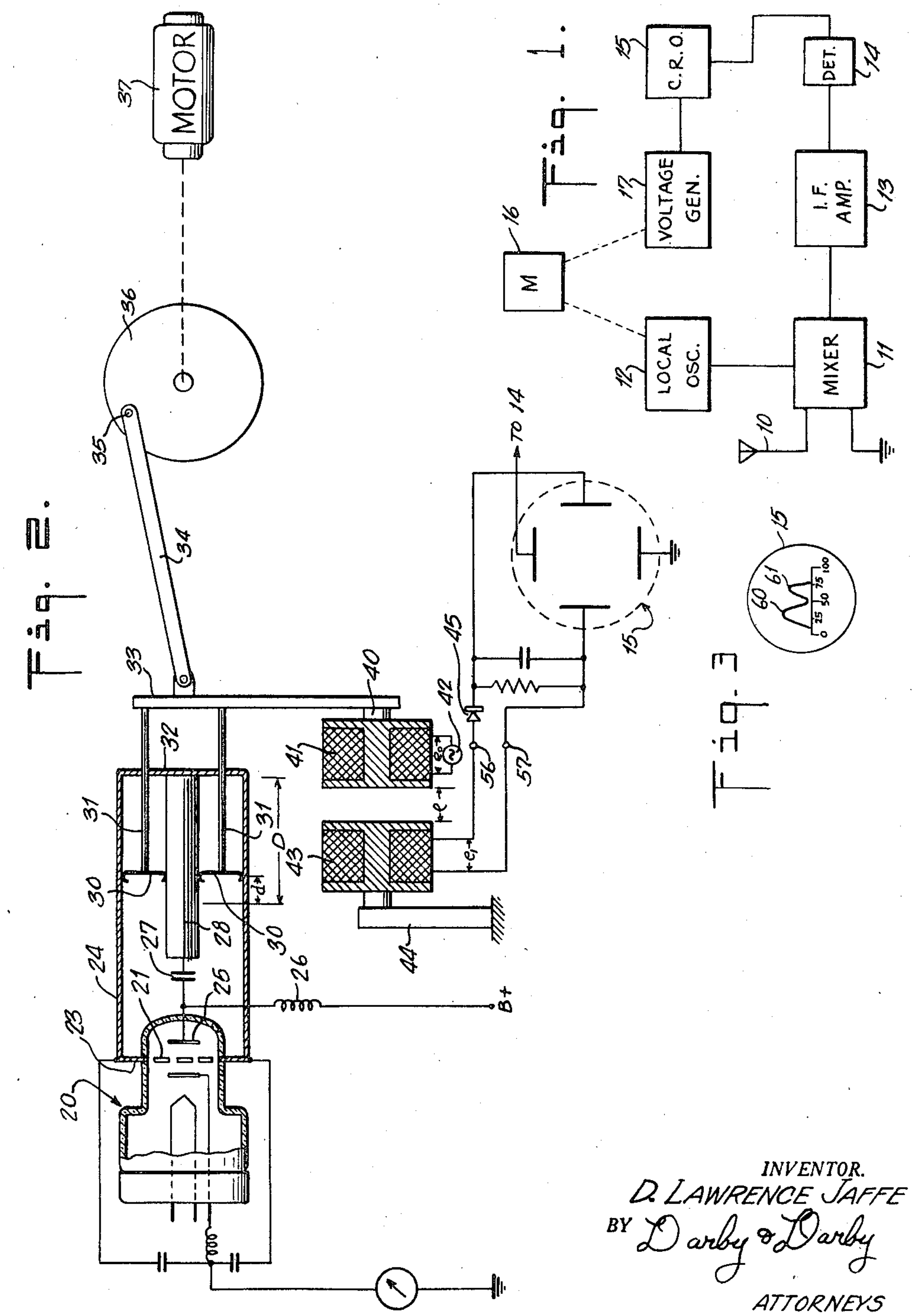

The present invention relates to means for generating a voltage which is linearly proportioned to frequency and particularly to the resonant frequency of a transmission line type of resonator.

Such a device is usable in many situations, one example being particularly described and illustrated in the drawings. This exemplary use is in a panoramic radio receiver in which it is desirable to cause horizontal deflection of the cathode beam of a cathode ray tube in linear proportion to the frequency being received.

In a panoramic radio receiver a transmission line type of resonator is frequently used as a local oscillator, the frequency thereof being varied continuously over a selected band, this oscillator frequency being mixed with a received radio signal, the intermediate frequency thus produced being detected and the detected signal being fed to the vertical deflection plates of a cathode ray oscillograph. Simultaneously a varying voltage is fed to the horizontal deflection plates of the cathode ray oscillograph so that there is indicated on the oscillograph the frequency of any signal which is received.

By means of this invention the signal fed to the horizontal deflection plates of the oscillograph is linearly proportional to the frequency so that the frequency scale of the oscillograph is linear rather than being non-uniform as has been the case in such systems heretofore used.

While, as stated above, a panoramic radio receiver has been illustrated and is an excellent example of one use of my invention, the invention may be used in many other situations where it is desirable to provide a varying voltage which is linearly proportional to frequency.

It is an object of the invention to provide a means for generating a voltage linearly proportional to frequency.

It is another object of the invention to provide such a linear proportionality of voltage to frequency in a system wherein mechanical tuning of a transmission line type resonator is employed.

It is a still further object of the invention to provide a panoramic radio receiver wherein the deflection of an indicating device is linearly proportional to the received carrier frequency.

Other objects and features of the invention will be apparent when the following description is considered in connection with the annexed drawings, in which, Figure 1 is a block diagram of a panoramic radio receiver;

Figure 2 is a diagrammatic showing of the local oscillator portion of a panoramic radio receiver showing particularly the means for continuously varying the tuning thereof together with the means for providing a voltage varying linearly with the frequency; and Figure 3 shows the face of a cathode ray tube and illustrates a curve which might be produced on such a cathode ray oscillograph by means of the voltage generating means of the invention.

Referring now to the drawings and particularly to a panoramic receiver as in Figure 1, the incoming signals are received on an antenna 10 and fed to a mixer 11. Signals generated by the local oscillator 12, the frequency of which is continuously varied in a manner shortly to be described, are also fed to the mixer 11.

Intermediate frequency signals from the mixer 11 are fed to the intermediate amplifier 13, detected by the detector 14 and applied to the vertical deflection plates of a cathode ray oscillograph 15.

The tuning of the local oscillator 12 is continuously varied by means of a motor 16 which motor also varies the voltage of voltage generator 17 in a manner shortly to be described. The voltage from the generator 17 is applied to the horizontal deflection plates of the cathode ray oscillograph 15. Thus the frequency of the local oscillator is continuously varied over a wide band and the intermediate frequency is thus constantly changed so that when a signal is received a pip will be observed on the cathode ray tube screen at a point along its horizontal axis corresponding to the frequency of that signal.

Referring now to Figure 2, there is shown therein a transmission line or a cavity resonator having an oscillator tube 12 (which is illustrated as of the "lighthouse" type), the grid 21 of the tube being connected by means of the usual flange member 23 to a hollow cylinder 24 forming the outer wall of the resonator. Plate 25 of the tube 12 is connected through the choke coil 26 to plate supply and is likewise coupled through a capacitance schematically shown by the capacitor 27 to a rod 28 located concentrically within the cylinder 24 and forming a part of the resonator.

Contact members 30 extending between the surface of rod 28 and the inner surface of cylinder 24 effectively liimt the electrical length of the cylinder 24 and thus determine the resonant frequency of the local oscillator comprising the elements just above described. It will be seen that with this arrangement movement of the contacts 30 longitudinally of the cylinder 24 varies the resonant frequency of the oscillator and permits the receiver to sweep over a band of frequencies.

Contacts 30 are mounted in any suitable manner upon arms 31 which extend through the end closure 32 of the cylinder 24 and are connected to a reciprocatory member 33 suitably mounted for reciprocatory movement along an extension of the axis of cylinder 24. The member or bar 33 is connected by means of a connecting rod 34 to a crank pin 35 on a crank disk 36 driven by a motor 16.

The reciprocatory member 33 is extended downwardly as shown in Figure 2 and has rigidly mounted on an extension 40 thereof a transformer coil 41, the coil 41 being connected to an external source of alternating voltage 42. A second transformer coil 43 is mounted on a bracket 44 fixed in any suitable manner to a support and in alignment with the coil 41 so that as member 33 reciprocates the coil 41 moves toward and away from the coil 43. Coil 43 is connected through a rectifier 45 to the horizontal plates of the cathode ray oscillograph 15, the vertical deflection plates of this oscillograph being fed a voltage from the output of the detector 14 or other source of detected received signal.

It will be seen that the motor 16 rotates the crank disk 36, the bar 33 is reciprocated causing contacts 30 to move along the rod 28 and the walls of cylinder 24 thereby cyclically varying the output frequency of the local oscillator 12. Simultaneously the transformer coil 41 is moved toward and away from the coil 43 thereby cyclically varying the voltage induced in coil 43, and hence varying the voltage supplied from the voltage generator 17 to the horizontal deflection plates of the cathode ray oscillograph 15. In order that it may be clear that the deflection voltage applied to the horizontal deflection plates of the cathode oscillograph is linearly proportional to the tuned frequency of the oscillator 12, the following mathematical analysis is given.

The wave length of the energy developed in the oscillator 12 can be expressed as follows:

$$\lambda = K_1 d = K_1 D f(t) \qquad (1)$$

in which $\lambda$=wave length
$K_1$=a constant
$d$=the instantaneous displacement of the contacts 30 from the left hand end of the rod 28
D=the total stroke of the contacts 30
$f(t)$=some function of time By definition also $$d = Df(t)$$

Since frequency F is inversely proportional to wave length, Equation (1) can be rewritten as follows:

$$F = \frac{K_2}{Df(t)} \qquad (2)$$

wherein
F=frequency
$K_2$=a constant, and
$Df(t)$ has the meaning stated above.

The amplitude of the voltage $e_1$ appearing across the coil 43 is inversely proportional to the distance between the coils 41 and 43. Thus, assuming that the voltage applied to the coil 41 is $e_0$, we can write an equation as follows:

$$e_1 = K_3 \frac{e_0}{l} \qquad (3)$$

Since by the nature of the mechanism previously described the distance $l$ is the same function of time as the distance D, Equation (1) above may be rewritten $$e_1 = \frac{K_3 e_0}{Lf(t)} \qquad (4)$$

where $l$ is some constant.

Eliminating $f(t)$ from Equations (2) and (4) we obtain $$F = \frac{K_2 L}{DK_3 e_0} e_1 \qquad (5)$$

From Equation (5) it is obvious that the envelope of the voltage $e_1$ appearing in coil 43 is linearly proportional to the frequency F and thus the displacement of the cathode beam along the X-axis of the cathode ray oscillograph is directly proportional to the frequency.

As described, the bar 33 is arranged for rectilinear motion and the magnetic coupling means, as may be, are located on the same side of the bar as the shorting contacts 30 for parallel equal movement therewith. It will be obvious that bar 33 might be pivoted at a point intermediate its ends and the coupling means mounted on the opposite side of the bar from the contacts 30 without affecting the linear variation of the voltage with respect to frequency. Additionally, other similar mechanical arrangements may be devised.

As is clearly indicated in Figure 3, with either of the arrangements described, the voltage applied to the horizontal deflection plates of the cathode ray oscillograph 15 varies linearly with the frequency so that the frequency of incoming signals such as represented at 60 and 61 may be readily determined by mere reading of the scale along the X-axis of the tube.

While I have described preferred embodiments of my invention it will be understood that many other mechanical arrangements may be utilized. I wish, therefore, to be limited not by the foregoing description, but solely by the claims granted to me.

This application is a division of my co-pending application for "Means for Generating a Voltage Linearly Proportional to Frequency" Serial 435,875 filed June 10, 1954.

What is claimed is:

1. A panoramic receiver comprising a local oscillator having a frequency varying inversely with respect to the movement of a frequency-determining member, means for receiving a received wave, a mixer coupled to said receiving means and to said local oscillator for deriving an intermediate frequency signal, means for detecting said intermediate frequency signal, a cathode ray oscillograph having vertical and horizontal deflecting plates, means for coupling said vertical deflecting plates to said detecting means, and means for producing a horizontal deflection voltage for application to said horizontal deflecting plates, said last-named means comprising a pair of inductively coupled coils, the first of said coils being fixed and the second being movable and having a coupling characteristic inversely proportional to the displacement therebetween, said second of said coils being coupled mechanically to said oscillator frequency-determining member, means for exciting one of said coils whereby the voltage induced in the other is inversely proportional to their separation, and motive means for continuously and cyclically moving said oscillator frequency-determining member and said other coil over a predetermined range to produce an output deflection voltage from said other coil varying with time in the same manner as said oscillator frequency varies with time, to produce a panoramic display on said oscillograph.

2. A panoramic receiver comprising a local oscillator having a frequency varying inversely with respect to the movement of a frequency-determining member, means for receiving a received wave, a mixer coupled to said receiving means and to said local oscillator for deriving an intermediate frequency signal, means for detecting said intermediate frequency signal, a cathode ray oscillograph having vertical and horizontal deflecting plates, means for coupling said vertical deflecting plates to said detecting means, and means for producing a horizontal deflection voltage for application to said horizontal deflecting plates, said last-named means comprising a pair of inductively coupled coils having a common axis, the first of said coils being fixed and the second being axially movable with respect to said first coil and having a coupling characteristic inversely proportional to the displacement therebetween, said second of said coils being coupled mechanically to said oscillator frequency-determining member, means for exciting one of said coils with an alternating voltage whereby the voltage induced in the other is inversely proportional to their separation, motive means for continuously and cyclically moving said oscillator frequency-determining member and said other coil over a predetermined range and means including a rectifier to produce an output deflection voltage from said other coil varying with time in the same manner as said oscillator frequency varies with time, to produce a panoramic display on said oscillograph.

References Cited in the file of this patent

UNITED STATES PATENTS 2,468,126 Silver ------------------ Apr. 26, 1949

OTHER REFERENCES

B. C. Clark and F. J. Kamphoefner: "Panoramic Sweep Circuits," Electronics, November 1949, pages 111, 112 and 114.